United States Patent [19]

Johnson, Jr.

[11] Patent Number: 4,962,186

[45] Date of Patent: Oct. 9, 1990

[54] METHOD OF IMPROVING THE COLOR OF TALL OIL ROSIN ESTERS BY RECRYSTALLIZING AND DISTILLING ROSIN FOLLOWED BY ESTERIFYING

[75] Inventor: Robert W. Johnson, Jr., Savannah, Ga.

[73] Assignee: Union Camp Corporation, Wayne, N.J.

[21] Appl. No.: 377,869

[22] Filed: Jul. 10, 1989

[51] Int. Cl.$^5$ .............................................. C09F 1/04
[52] U.S. Cl. ................................. 530/218; 530/215; 530/228; 530/232

[58] Field of Search ................ 260/104; 530/218, 215, 530/228, 232

[56] References Cited

U.S. PATENT DOCUMENTS 4,248,770  2/1981  Matsuo et al. ..................... 260/104

*Primary Examiner*—Harold D. Anderson
*Attorney, Agent, or Firm*—Edward J. Sites

[57] ABSTRACT

A method of improving the color of tall oil rosin esters comprising the sequential steps of (a) recrystallizing a tall oil rosin from a solvent, (b) purifying the crystalline portion by distillation, and (c) esterifying the resultant rosin with a polyol.

8 Claims, No Drawings

METHOD OF IMPROVING THE COLOR OF TALL OIL ROSIN ESTERS BY RECRYSTALLIZING AND DISTILLING ROSIN FOLLOWED BY ESTERIFYING

BACKGROUND OF THE INVENTION

1. Field of the Invention

The invention relates to a method of improving the color of tall oil rosin esters.

2. Brief Description of the Prior Art

The prior art literature is replete with descriptions of methods for esterifying rosin with a polyol. Representative of such literature are the U.S. Pat. Nos. 1,696,337; 1,697,530; 1,734,987; 1,893,982; 2,327,009; 2,369,125; 2,409,332; 2,420,926; 2,434,168; 2,440,242; 2,536,600; 2,572,086; 2,590,910; 2,736,664; 2,864,810; and 3,780,012.

The large number of prior art references describing the esterification of rosin with a polyol is a reflection of the need in the art for improvements in methods of preparation. The method of the present invention is such an improvement, resulting in a more efficient process and a unique product composition.

As described by Sanderson in the U.S. Pat. No. 4,643,847 (1987), the use of a selective solvent refining process to improve the color of rosin by removing certain visible dark color bodies and latent color bodies from the rosin is disclosed in the earlier U.S. Pat. No. 1,715,085. The process comprises the formation of a solution of gasoline, rosin and furfural ($C_5H_4O_2$), its cooling or refrigeration with resultant separation of furfural and coloring bodies, and the recovery of high grade rosin from the remaining solution. The wood rosin may be subjected to distillation prior to the solvent extraction.

Tall oil rosin contains color bodies or coloring matter visible to the naked eye and certain color bodies which are not normally visible to the naked eye, usually referred to as latent color bodies. The visible coloring matter in a tall oil rosin determines its grade and hence its value. The darker the rosin, the lower its grade and value. The presence of invisible or latent color bodies, while not affecting the apparent grade, is highly disadvantageous in the case of tall oil rosin since they render the polyol esters produced therefrom undesirable for use in the production of products where palest color of the product and stability of color are desired. In tall oil rosin, latent color bodies contained therein do not color the tall oil rosin until the rosin is esterified with pentaerythritol or like polyols to form an ester, or treated in the presence of oxygen, such as in the manufacture of hot melt adhesives.

The method of the present invention provides esters of rosin having improved, lighter colors which are stable, with a minimum of labor and cost.

U.S. Pat. No. 4,248,770 (Matsuo et al, 1981) discloses a method for preparing a stabilized tall oil rosin ester which comprises subjecting a rosin to disproportionation followed by purification and then esterification of the resulting purified disproportionated rosin with a polyol. The purification can be by distillation, crystallization or extraction.

SUMMARY OF THE INVENTION

According to the present invention, there is provided a method of improving the color of tall oil rosin esters comprising the sequential steps of (a) recrystallizing a tall oil rosin from a solvent, (b) purifying the crystalline portion by distillation, and (c) esterifying the resultant rosin with a polyol. The tall oil rosin esters produced by the method of this invention are improved up to three color grades over the color achieved by either solvent refining or distilling the tall oil rosin alone. Further, the improved tall oil rosin esters of this invention form a pentaerythritol ester which is eight color grades lighter and a glycerine ester which is four to five color grades lighter than the same ester produced from a tall oil rosin which has not been treated in accordance with the invention.

DETAILED DESCRIPTION OF THE PREFERRED EMBODIMENTS OF THE INVENTION

The tall oil rosins which may be esterified in the method of the invention are well known compounds as are methods of their preparation. Rosin is mainly a mixture of $C_{20}$, fused-ring, monocarboxylic acids, typified by levopimaric and abietic acids. The rosin may be hydrogenated or disproportionated rosin as well as crude, untreated rosin.

In an initial step, the tall oil rosin is first recrystallized from a solvent. The recrystallization technique is well known to those skilled in the art, and details need not be recited herein. The solvent may be, for example, n-hepane, acetone, naphtha, and the like.

The recrystallized rosin is then subjected to distillation. Generally distillation may be carried out at a temperature from 150 C. to 300 C. at pressures of from 0.05 to 50 mmHg, until no further distillate is taken off.

The polyols employed in the esterification of the invention are also well known and are represented by diols such as ethylene glycol, propylene glycol, diethylene glycol, triethylene glycol, tetraethylene glycol, trimethylene glycol; triols such as glycerol; tetrols such as pentaerythritol; hexols such as mannitol invention is particularly advantageous when the polyol selected is pentaerythritol.

The esterification step of the invention may be carried out in the presence of a catalytic proportion of an esterification catalyst. Representative of known catalyst, employed in catalytic proportions, are calcium hydroxide, zinc oxide, phosphoric acid, p-toluene sulfonic acid, lithium carbonate and the like. A catalytic proportion is generally within the range of from about 0.01 to 5.0 percent by weight of the rosin, preferably 0.1 to 1.0 percent.

Esterification is advantageously carried out by bringing together the rosin and an equivalent excess of the polyol in an appropriate reaction vessel and heating the mixture to a temperature within the range of from about 150° C. to 300° C., preferably 180° C. to 280° C. Advantageously, a 5 to 40 percent equivalent excess of the polyol is employed in the reaction mixture; preferably 10 to 30 percent equivalent excess.

Esterification may be carried out under a broad range of pressure conditions including sub-, super- and atmospheric pressures. Advantageously, atmospheric pressures are employed.

Advantageously, the esterification reaction can be accomplished in the presence of an inert atmosphere, such as a nitrogen gas atmosphere provided by a nitrogen purge of the reaction vessel prior to addition of the reactants and a nitrogen sparge during the reaction. Since light color is a desirable property of the rosin ester and the color is sensitive to oxygen exposure, oxygen exposure is preferably minimized.

Advantageously, one or more additives are included in the esterification mixture, which additives act to effectively bleach the rosin and/or rosin esters that are formed. The additives which have been found to be particularly effective are, for example, phenol sulfides such as amylphenoldisulfide, hypophosphorous acid, and phosphorous acid. The amount of the additives which need to be added to effectively bleach the rosin esters is relatively small and dependent on the particular additive or combination of additives employed. The amounts required to be added are similar to the amounts employed with conventional rosin esters and as such are well known to those skilled in the art.

Progress of the esterification may be followed by conventional analyses of the reaction mixture to determine the acid number. In general, the reaction is accepted as sufficiently complete when the acid number is 15 or below.

The following examples describe the manner and the process of making and using the invention and set forth the best mode contemplated by the invention for carrying out the invention, but are not be considered as limiting the invention.

The softening points were determined by the Ball and Ring method of ASTM test method 28-58T.

The rosin ester colors referred to herein were measured on the Gardner Color Scale using the Gardner Delta Comparator. Gardner colors were measured on the resin as a 50/50 w/w solution in toluene.

EXAMPLE 1

1000 grams of rosin recrystallized from acetone solvent is distilled at a temperature of 240°–280° C. under a pressure of 1–2 mmHg and placed in a 2 liter reaction flask, set up in a hood using an agitator, thermometer and nitrogen purge. After the rosin is melted, agitation is started and 3.0 grams of amylphenolsulfide polymer (Vultac-2, Pennwalt Corp.) is added to the rosin at 160° C. Catalyst ($H_3PO_3$) 0.2% (50% in water) is added via buret over a period of 15 minutes. The rosin is then esterified with the addition of 121 gms of pentaerythritol and heating to 275° C. for 6 hours. The product ester has an acid number of 12 and a Gardner color of 1.

EXAMPLE 2 (COMPARATIVE)

The same procedure as employed as in Example 1 is followed except the rosin is not first recrystallized. The color of the product ester was Gardner 4.

EXAMPLE 3 (COMPARATIVE)

The same procedure is employed as in Example 1 except there is no distillation of the recrystallized rosin. The color of the product ester was Gardner 4.

These comparative examples show that without the use of a recrystallized rosin with subsequent distillation, an ester with a darker color is obtained, than in accordance with the method of the invention.

What is claimed is:

1. A method of improving the color of tall oil rosin esters which comprises the sequential steps of:
    (a) recrystallizing the tall oil rosin from solvent,
    (b) distilling the recrystallized rosin, and
    (c) esterifying the distilled rosin with a polyol.
2. The method of claim 1 wherein the polyol is pentaerythritol.
3. The method of claim 1 carried out under an inert gas atmosphere.
4. The method of claim 3, wherein the inert gas is nitrogen.
5. The method of claim 1 carried out in the presence of a catalytic proportion of an esterification catalyst.
6. The method of claim 1 carried out in the presence of a phenol sulfide.
7. The method of claim 6 carried out in the presence of hypophosphorous acid.
8. The method of claim 6 carried out in the presence of phosphorous acid.

* * * * *